UNITED STATES PATENT OFFICE.

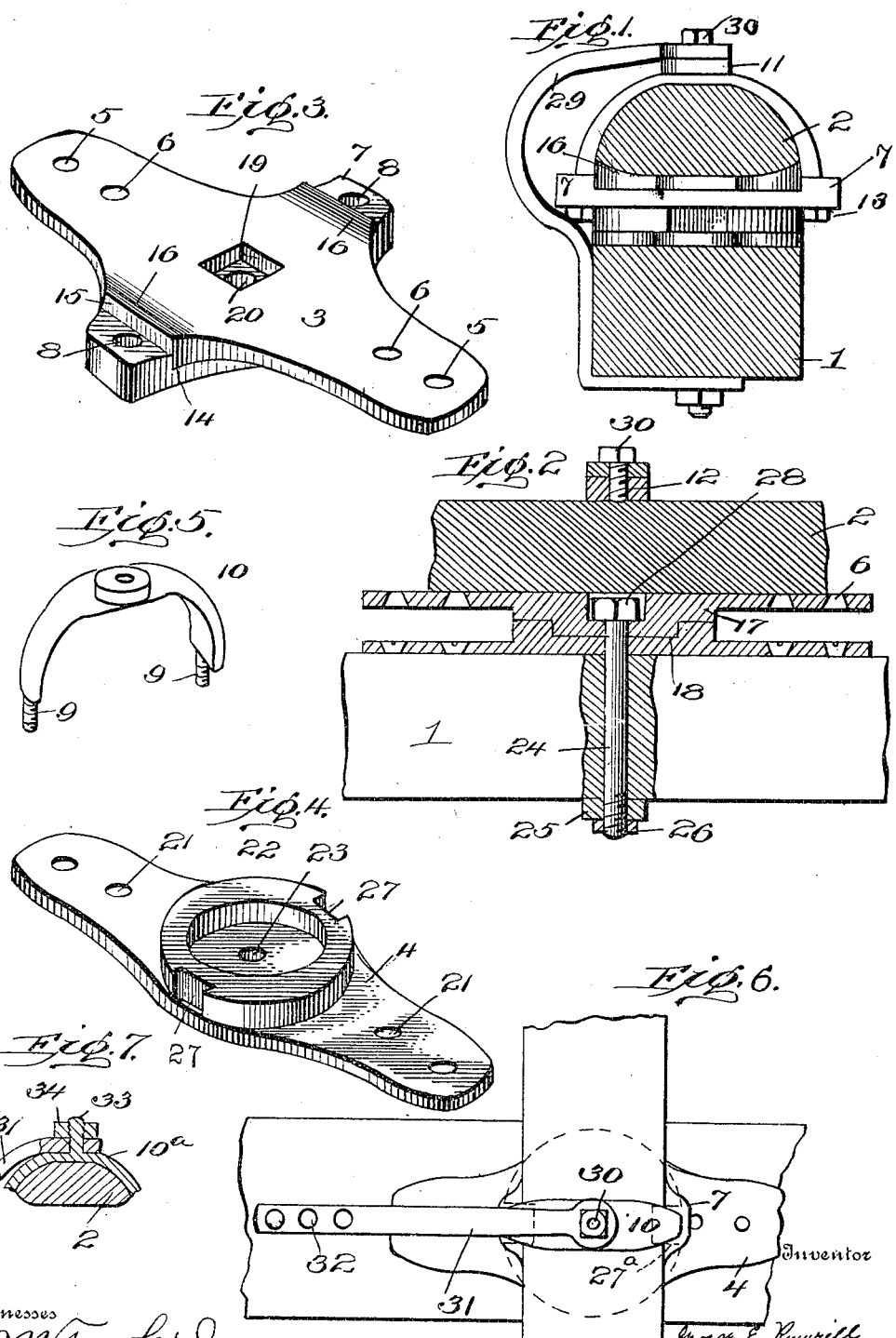

GEORGE EDWARD RUMRILL, OF CARROLLTON, ILLINOIS.

DOUBLETREE AND WHIFFLETREE COUPLING.

No. 812,093.    Specification of Letters Patent.    Patented Feb. 6, 1906.

Application filed April 19, 1905. Serial No. 256,336.

*To all whom it may concern:*

Be it known that I, GEORGE EDWARD RUMRILL, a citizen of the United States, residing at Carrollton, in the county of Greene and State of Illinois, have invented certain new and useful Improvements in Doubletree and Whiffletree Couplings; and I do hereby declare the following to be a full, clear, and exact description of the invention, such as will enable others skilled in the art to which it appertains to make and use the same.

This invention relates to improvements in coupling devices, and particularly to whiffletree-couplings.

One of the objects of the invention is the construction of a coupling device employing two peculiarly-constructed plates or members which are removably secured together.

Another object of the invention is the construction of a coupling device which may be employed for connecting a whiffletree to a doubletree or for connecting a doubletree to the tongue of a vehicle.

A still further object of the invention is the construction of a coupling device which entirely encircles the whiffletree and does not employ means extending through the same for holding said whiffletree upon the doubletree.

With these and other objects in view the invention consists in certain novel constructions and combinations of parts, which will be hereinafter specifically described, and pointed out in the claims hereto appended.

Figure 1 is a view in side elevation of a device constructed in accordance with the present invention, showing the same applied to a doubletree. Fig. 2 is a longitudinal sectional view of the device depicted in Fig. 1, showing a portion of a doubletree and a whiffletree in section. Fig. 3 is a perspective view of the upper primary plate. Fig. 4 is a perspective view of the lower or auxiliary plate. Fig. 5 is a perspective view of the clip or yoke. Fig. 6 is a top plan view of another embodiment of the present invention. Fig. 7 is a fragmentary sectional view of the embodiment shown in Fig. 6.

Referring to the drawings by numerals, 1 designates a doubletree upon which is secured, by means of my coupling device, a whiffletree 2.

The primary or upper plate 3 is removably secured upon an auxiliary or lower plate 4. The primary plate comprises a substantially flat body provided with integral extended portions 5 5, within which are formed apertures 6. The apertures 6 may be employed for fixedly securing the whiffletree 2 against longitudinal movement by inserting any suitable short fastening means, as small screws, into the bottom portion of the whiffletrees through said apertures 6. Lateral extensions 7 7 are formed upon the plate 3. Each of said extensions 7 is provided with an aperture 8 for receiving the reduced threaded ends 9 of the clip or yoke 10. The top or upper portion of the clip or yoke 10 is provided with an annular extension 11. The annular extension 11 is provided with a threaded aperture 12. The clip 10 is removably secured upon the upper or primary plate 3 by means of nuts 13. Upon the upper or primary plate 3 and contiguous to the lateral extension 7 is formed parallel guides or ribs 14. The ribs 14 are provided with a vertical edge 15 and with a concave top surface 16. An integral primary extension 17 is formed upon the bottom of the upper or primary plate 3. An integral annular auxiliary extension 18 projects from said primary extension 17. The upper or primary plate 3 is provided with a squared socket 19 and with an aperture 20. This socket 19 and aperture 20 are formed centrally of the plate.

The auxiliary plate 4 comprises a flat body portion provided with apertures 21. The apertures 21 are formed for receiving fastening means whereby said plate 4 is secured to a support—as, for instance, the doubletree 1. An annular hollow extension 22 is formed upon the body portion of the plate 4 for receiving the auxiliary annular extension 18 of the upper or primary plate 3. The plate 4 is provided with a central aperture 23, which registers, when the primary and auxiliary plates are assembled, with aperture 20 for permitting of the insertion of the draft-bolt 24, which is removably secured in position upon the support by means of nuts 25 and 26. The nut 26 constitutes a locking member for preventing the nut 25 from being removed under normal conditions. The annular extension 22 is provided with squared notches 27, which receive portions of the nuts 13 when the elements constituting the device are in their normal assembled position.

After the primary and auxiliary plates have been positioned as shown in Fig. 2 the bolt 24 is passed through the apertures 20 and 23, as well as the aperture formed in the doubletree 1. The bolt 24 is provided with a squared head 28, which is of less thickness than the width of the squared recess 19. It will be seen upon referring to Fig. 2 that there is a slight space between the head 28 and the walls of the recess 19. The object of having the head smaller than the recess 19, so that said head will not fit snugly within said recess, is that it is desirable to allow of slight movement of the upper or whiffletree-carrying plate 3 without moving the draft-bolt 24. It will also be obvious that owing to the squared structure of the recess 19 and the head 28 rotary movement of said bolt will be prevented. After the plates have been assembled the clip or yoke 10 is positioned upon the upper or primary plate, as shown in Fig. 1. The nuts 13 secure the clip in a fixed position upon the primary plate. After the plates and clip have been assembled the clevis 29 is positioned upon the upper portion of the clip and end of the draft-bolt 24. The crown-bolt 30 is positioned within the upper apertured portion of the clevis and is threaded into the aperture 12 of the clip 10.

Referring to Fig. 6, I have shown an embodiment of my invention illustrating the means whereby the plates may be employed for securing a whiffletree or doubletree to the tongue of a vehicle. In this embodiment I use substantially the same parts as in my preferred structure, except I employ in the place of the clevis 29 a hammer-strap 31, which is fixedly secured at 32 to the tongue. The metallic strap 31 is apertured upon its outer end for receiving the crown-bolt 30 in the same manner as when employing the clevis. Of course it will be obvious that when the coupling device is positioned upon the tongue of a vehicle the clevis could not be used, as it is positioned upon the side of the whiffletree and exactly where the tongue is positioned—that is, at right angles to the whiffletree.

In Fig. 7 instead of using the crown-bolt 30 I form an integral extension 33 upon the clip 10ª and position the apertured end of the hammer-strap 31 upon said extension. The extension 33 is screw-threaded for receiving a nut 34.

It is to be noted that the head 28 of draft-bolt 24 does not extend into the whiffletree. Furthermore, I do not weaken the whiffletree by extending a bolt through the same, as is common in the art. The strength of the whiffletree is greatly increased by obviating the necessity of weakening the same by extending bolts through the same for securing any or all of the parts of a device together.

In the embodiment shown in Fig. 6 the plate 4 is provided with squared recesses 27ª, formed at right angles to the notches 27 of the plate 4. (Shown in Fig. 4.) The notches formed as shown in Fig. 4 are not necessary when the upper plate 3 is positioned as shown in Fig. 6, or, in other words, when plate 3 is positioned at right angles to plate 4 the nuts 13 will engage opposite portions of the plate 4 when the plates are arranged as shown in Fig. 2, thereby necessitating the forming of notches 27ª and preferably omitting the notches 27.

What I claim as new, and desire to secure by Letters Patent of the United States, is—

1. A device of the character described comprising a primary plate provided with a central squared recess and an aperture, parallel ribs formed upon said plate, each of said ribs provided with a concave upper surface and with a vertical side, said plate provided with an annular extension formed upon its base, an auxiliary plate provided with a hollow annular extension projecting from its upper face, said annular extension of the auxiliary plate provided with squared notches, a draft-bolt positioned upon and securing said plates together, a removable clip carried by said primary plate, said removable clip provided with a threaded aperture, a clevis provided with apertured ends positioned upon said clip and draft-bolt, a crown-bolt positioned within one of the apertures of said clevis and threaded into the aperture of said clip, and means carried by said draft-bolt for securing said clevis in a fixed position thereon.

2. In a device of the character described, the combination with a support, of a primary and an auxiliary plate, parallel ribs formed upon said primary plate, each of said ribs provided with a beveled upper surface, said primary plate provided with a recess, a bolt provided with a squared head positioned upon said plates, the squared head of said bolt positioned within the squared recess of said primary plate, a removable clip carried by said primary plate, and means connecting the upper portion of said clip and the lower portion of said bolt with said support.

3. A device of the character described comprising a primary and an auxiliary plate, said primary plate, provided with an annular downward extension and a squared central recess, said auxiliary plate provided with an annular extension, said extension provided with notches formed upon its periphery means for securing said plates together, a clip carried by said primary plate, and means for securing said clip in a fixed position upon said plate.

4. A device of the character described comprising a primary and an auxiliary plate, said primary plate provided with ribs, each of said ribs having a beveled upper face and a vertical side, means for securing said plates together, a clip carried by said plates, means for securing said clip, primary and auxiliary plates in an assembled position.

5. In a device of the character described the combination with a support, of an auxiliary plate carried by said support, said auxiliary plate provided with a central recess and an aperture, squared notches formed upon said auxiliary plate, a primary plate provided with an aperture and an annular extension positioned upon said auxiliary plate, and having the annular extension projecting into the central recess, said primary plate provided with apertured, lateral extensions, ribs formed contiguous to said lateral extensions upon said plate, each of said ribs provided with beveled and vertical faces, said primary plate provided with a squared central recess and an aperture, the aperture of said primary plate registering with the aperture of said auxiliary plate, a draft-bolt provided with a squared head positioned within the central aperture of said primary plate and the registering aperture of said auxiliary plate, the squared head of said draft-bolt positioned within the squared recess of said primary plate, a removable clip carried by said primary plate, the ends of said clip positioned within the apertured portion of said lateral extensions, nuts positioned upon the ends of said clip, and means carried by said support and connecting the clip and draft-bolt with said support.

6. A coupling device comprising a primary plate provided with parallel ribs, each rib provided with vertical and beveled faces, said primary plate provided with apertured lateral extensions projecting therefrom, contiguous to said ribs, an auxiliary plate provided with an annular extension formed integral upon its upper surface, said annular extension provided with notches formed upon its periphery, said primary plate provided with an extension projecting downwardly therefrom and adapted to be positioned within the annular extension of said auxiliary plate, and means securing said plates together.

In testimony whereof I affix my signature in presence of two witnesses.

GEORGE EDWARD RUMRILL.

Witnesses:
CHARLES H. ELDRED,
JOHN J. ELDRED.